(12) United States Patent
Heebner

(10) Patent No.: US 7,587,103 B2
(45) Date of Patent: Sep. 8, 2009

(54) METHOD FOR ULTRAFAST OPTICAL DEFLECTION ENABLING OPTICAL RECORDING VIA SERRATED OR GRADED LIGHT ILLUMINATION

(75) Inventor: John E. Heebner, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 12/168,677

(22) Filed: Jul. 7, 2008

(65) Prior Publication Data

US 2009/0016667 A1 Jan. 15, 2009

Related U.S. Application Data

(60) Provisional application No. 60/958,960, filed on Jul. 9, 2007.

(51) Int. Cl.
*G02B 6/00* (2006.01)
*G02F 1/295* (2006.01)
*H04J 14/02* (2006.01)
*G01J 3/28* (2006.01)

(52) U.S. Cl. .......................... 385/5; 385/131; 385/140; 385/36; 385/37; 398/79; 398/86; 398/87; 356/326

(58) Field of Classification Search .................. 385/4, 385/5, 8, 9, 10, 15, 24, 27, 31, 36, 37, 40, 385/46, 129, 130, 131, 132, 140; 398/79, 398/82, 84, 86, 87, 101; 356/326, 328, 330
See application file for complete search history.

(56) References Cited

U.S. PATENT DOCUMENTS 5,133,027 A * 7/1992 Funazaki et al. ................ 385/5

(Continued)

OTHER PUBLICATIONS

Walden, "Analog-to-Digital Converter Survey and Analysis" IEEE Journal on Selected Areas in Communication, vol. 17, No. 4, Apr. 1999.

(Continued)

*Primary Examiner*—Brian M Healy
(74) *Attorney, Agent, or Firm*—John H. Lee

(57) ABSTRACT

In one general embodiment, a method for deflecting an optical signal input into a waveguide is provided. In operation, an optical input signal is propagated through a waveguide. Additionally, an optical control signal is applied to a mask positioned relative to the waveguide such that the application of the optical control signal to the mask is used to influence the optical input signal propagating in the waveguide. Furthermore, the deflected optical input signal output from the waveguide is detected in parallel on an array of detectors. In another general embodiment, a beam deflecting structure is provided for deflecting an optical signal input into a waveguide, the structure comprising at least one wave guiding layer for guiding an optical input signal and at least one masking layer including a pattern configured to influence characteristics of a material of the guiding layer when an optical control signal is passed through the masking layer in a direction of the guiding layer. In another general embodiment, a system is provided including a waveguide, an attenuating mask positioned on the waveguide, and an optical control source positioned to propagate pulsed laser light towards the attenuating mask and the waveguide such that a pattern of the attenuating mask is applied to the waveguide and material properties of at least a portion of the waveguide are influenced.

34 Claims, 4 Drawing Sheets

U.S. PATENT DOCUMENTS

| | | | | |
|---|---|---|---|---|
| 5,802,223 | A | * | 9/1998 | Nashimoto ..................... 385/8 |
| 6,052,213 | A | * | 4/2000 | Burt et al. ................... 359/237 |
| 6,847,741 | B2 | * | 1/2005 | Sakamoto et al. .............. 385/5 |
| 2009/0016667 | A1 | * | 1/2009 | Heebner ........................ 385/5 |

OTHER PUBLICATIONS

Han et al., "Photonic Time-Stretched Analog-to-Digital Converter: Fundamental Concepts and Practical Considerations" Journal of Lightwave Technology, vol. 21, No. 12, Dec. 2003.

* cited by examiner

METHOD FOR ULTRAFAST OPTICAL DEFLECTION ENABLING OPTICAL RECORDING VIA SERRATED OR GRADED LIGHT ILLUMINATION

RELATED APPLICATIONS

This application claims priority to provisional U.S. application Ser. No. 60/958,960 filed on Jul. 9, 2007, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to recording and/or manipulating optical signals, and more particularly to mapping fast optical signals from serial temporal representations into parallel angular representations for subsequent recording and/or manipulation.

BACKGROUND

Conventional signal recording technologies include vacuum tube oscilloscopes and digital oscilloscopes. Vacuum tube oscilloscopes are becoming obsolete because of the inability to satisfy the demands associated with new technology. Digital oscilloscopes rely largely on state-of-the-art electronic-based analog-to-digital converters that have exhibited very slow improvement in recent years.

While the sampling resolution of digital oscilloscopes has improved incrementally, the dynamic range at the maximum sampling rate is inversely related to it, forcing a tradeoff between sampling resolution and dynamic range.

SUMMARY

In one general embodiment, a method for deflecting an optical signal input into a waveguide is provided. In operation, an optical input signal is propagated through a waveguide. Additionally, an optical control signal is applied to a mask positioned relative to the waveguide such that the application of the optical control signal to the mask is used to influence the optical input signal propagating in the waveguide. Furthermore, the deflected optical input signal output from the waveguide is detected in parallel on an array of detectors.

In another general embodiment, a beam deflecting structure is provided for deflecting an optical signal input into a waveguide, the structure comprising at least one wave guiding layer for guiding an optical input signal and at least one masking layer including a pattern configured to influence characteristics of a material of the guiding layer when an optical control signal is passed through the masking layer in a direction of the guiding layer.

In another general embodiment, a system is provided including a waveguide, an attenuating mask positioned on the waveguide, and an optical control source positioned to propagate pulsed laser light towards the attenuating mask and the waveguide such that a pattern of the attenuating mask is applied to the waveguide and material properties of at least a portion of the waveguide are influenced.

Other aspects and embodiments of the present invention will become apparent from the following detailed description, which, when taken in conjunction with the drawings, illustrate by way of example the principles of the invention.

DETAILED DESCRIPTION

Figure 1:
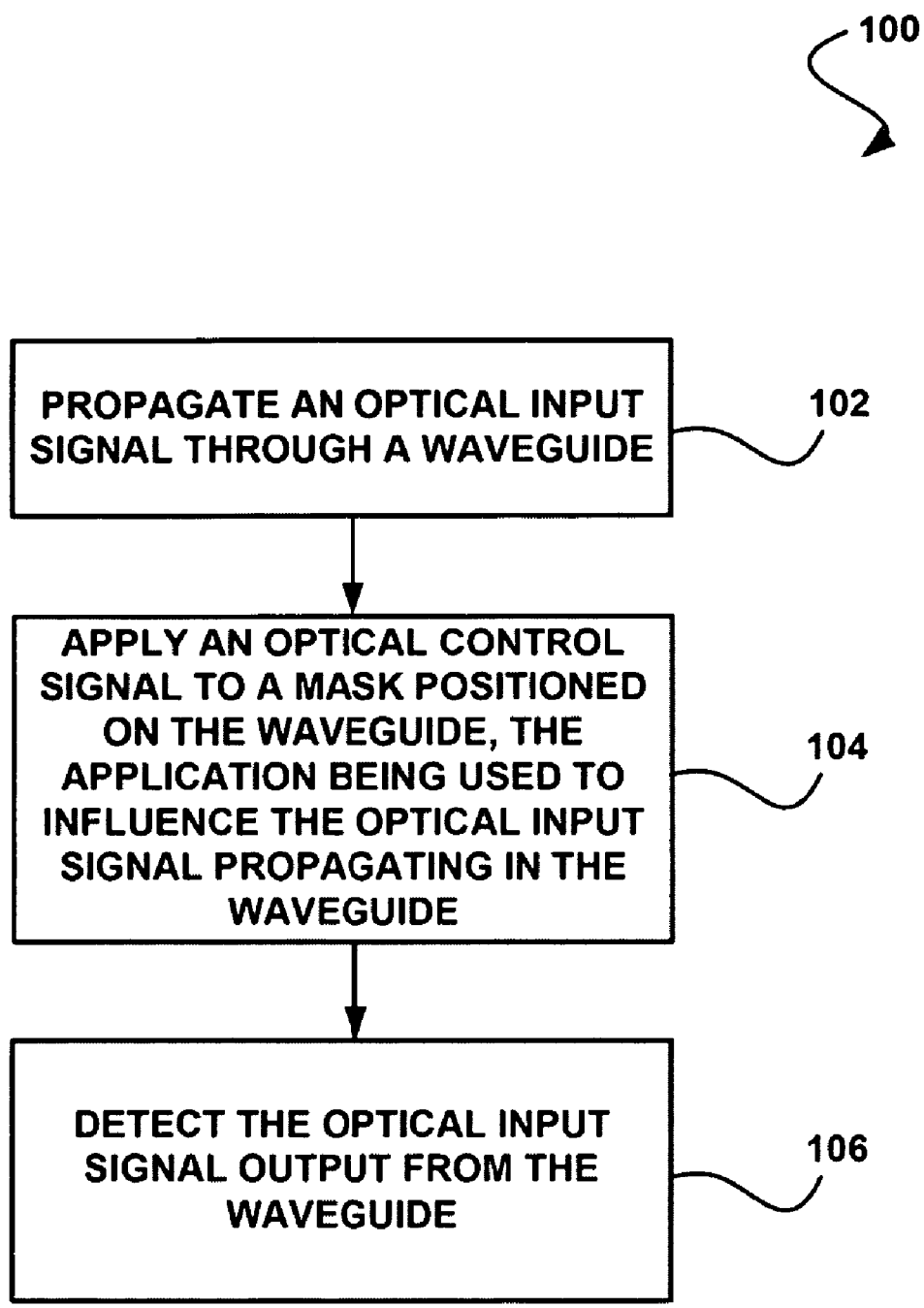
FIG. 1 shows a method for deflecting an optical signal input into a waveguide, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method for deflecting an optical signal input into a waveguide is provided. In operation, an optical input signal is propagated through a waveguide. Additionally, an optical control signal is applied to a mask positioned relative to the waveguide such that the application of the optical control signal to the mask is used to influence the optical input signal propagating in the waveguide. Furthermore, the deflected optical input signal output from the waveguide is detected in parallel on an array of detectors.

In another general embodiment, a beam deflecting structure is provided for deflecting an optical signal input into a waveguide, the structure comprising at least one wave guiding layer for guiding an optical input signal and at least one masking layer including a pattern configured to influence characteristics of a material of the guiding layer when an optical control signal is passed through the masking layer in a direction of the guiding layer.

In another general embodiment, a system is provided including a waveguide, an attenuating mask positioned on the waveguide, and an optical control source positioned to propagate pulsed laser light towards the attenuating mask and the waveguide such that a pattern of the attenuating mask is applied to the waveguide and material properties of at least a portion of the waveguide are influenced.

As mentioned above, in previous attempts, the dynamic range at the maximum sampling rate is inversely related to it, forcing a tradeoff between sampling resolution and dynamic range. At least some embodiments of the present invention addresses this limitation by decoupling the sampling resolution and dynamic range through a method of serial to parallel conversion achieved by optical deflection.

More illustrative information will now be set forth regarding various optional architectures and features with which the foregoing framework may or may not be implemented, per the desires of the designers or user. It should be strongly noted that the following information is set forth for illustrative purposes and should not be construed as limiting in any manner. Any of the following features may be optionally incorporated with or without the exclusion of other features described.

FIG. 1 shows a method 100 for deflecting an optical signal input into a waveguide, in accordance with one embodiment. As shown, an optical input signal is propagated through a waveguide. See operation 102. In the context of the present description, a waveguide refers to any structure capable of guiding a light wave.

Additionally, an optical control signal is applied to a mask positioned relative to the waveguide such that the application of the optical control signal to the mask is used to influence the optical input signal propagating in the waveguide. See operation 104. As an option, the mask may be positioned on or above the waveguide. Additionally, in order to influence the optical input signal, the mask may include a pattern. For example, in various embodiments, the pattern may include a pattern of triangles, prisms, wedges, or other shapes.

Furthermore, the mask may be any type of mask, such as an attenuating mask. In this case, the mask may include any material that is opaque to the optical control signal. In other words, the pattern of the mask may block portions of the optical control signal such that only portions of the control signal not masked are able to propagate into the waveguide. Thus, the optical control signal may acquire the pattern by passing through the mask.

In this way, the optical control signal may imprint the pattern into the waveguide. For example, material characteristics of the waveguide may be altered in locations defined by the pattern. On the other hand, areas in the waveguide corresponding to masked portions of the optical control signal may maintain the original material characteristics of the waveguide.

By imprinting the pattern into the waveguide, at least a portion of the input signal may be influenced by the pattern. For example, the altered material characteristics of the waveguide may alter optical characteristics of the input signal. In this case, the altered material characteristics of the waveguide may include an index of refraction. Thus, the optical characteristics of the input signal that are altered may include an angle. In other words, the input beam may be influenced by changing a direction of a portion of the input signal.

Additionally, a length of time of propagation of the input signal may correspond to an amount of the change of the portion of the input signal. For example, a first point of the input signal, which was input first into the waveguide, may not be deflected much or at all, whereas a second point of the input signal, input into the waveguide at later time than the first point, may be deflected. Furthermore, a third point of the input signal, input into the waveguide at later time than the second point, may be deflected even more than the second point.

As shown further in FIG. 1, the optical input signal output from the waveguide is detected. See operation 106. In one embodiment, the detection may be performed utilizing an array of detectors. In another embodiment, the detection may be performed utilizing a camera.

It should be noted that the optical control signal may include laser light from a pulsed laser source synchronized with the input signal. Additionally, the optical control signal pulse may have a shorter duration than a time scale of the signal to be detected. Furthermore, to have an efficient effect upon the guiding layer, the control beam should be highly absorbing. This demands that the wavelength of the optical control signal pulse be shorter than the band gap of the material used for the guiding layer.

Figure 2A:
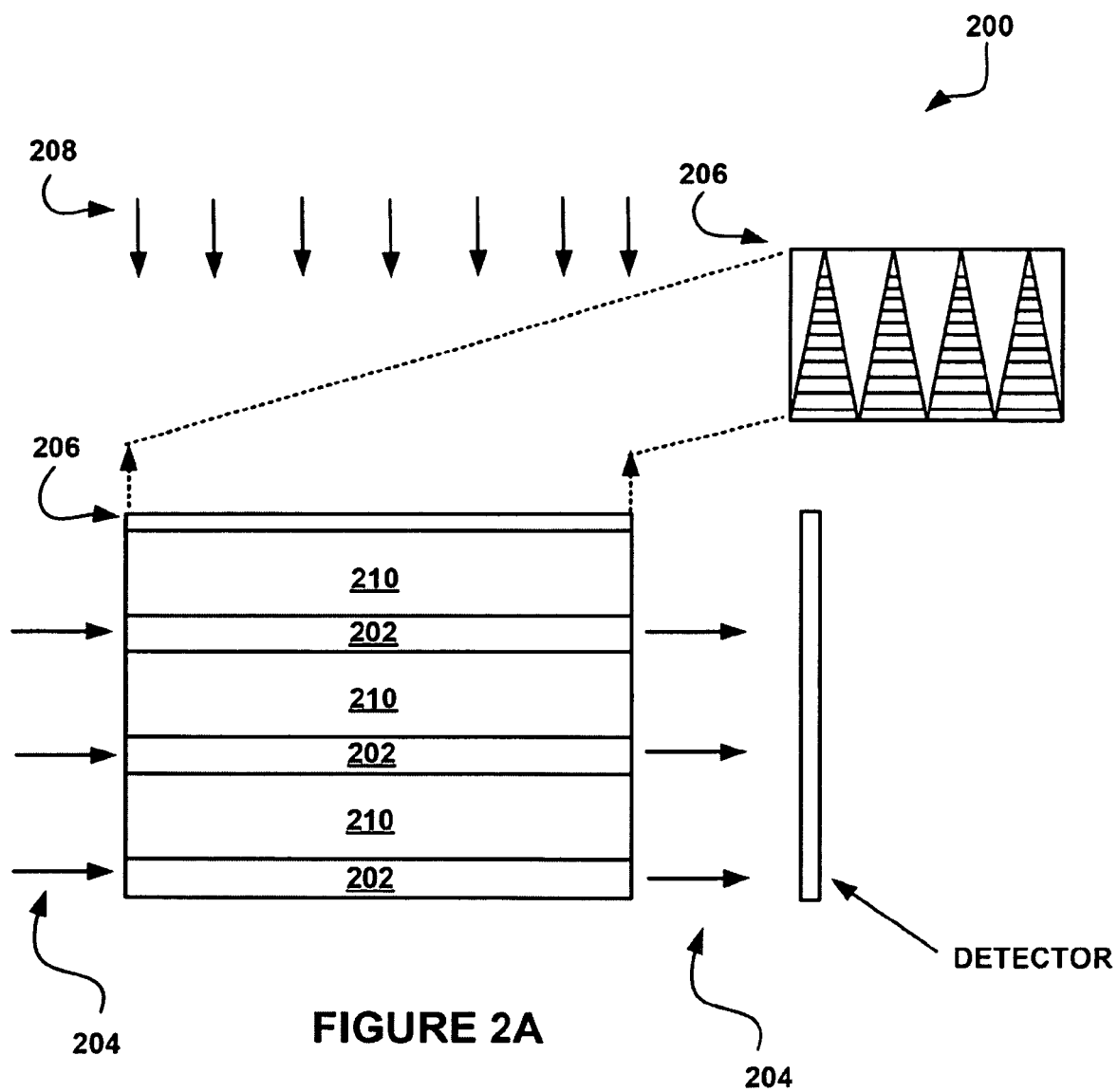
FIGS. 2A and 2B show a beam deflecting structure for deflecting an optical signal input into a waveguide, in accordance with one embodiment.
Figure 2B:
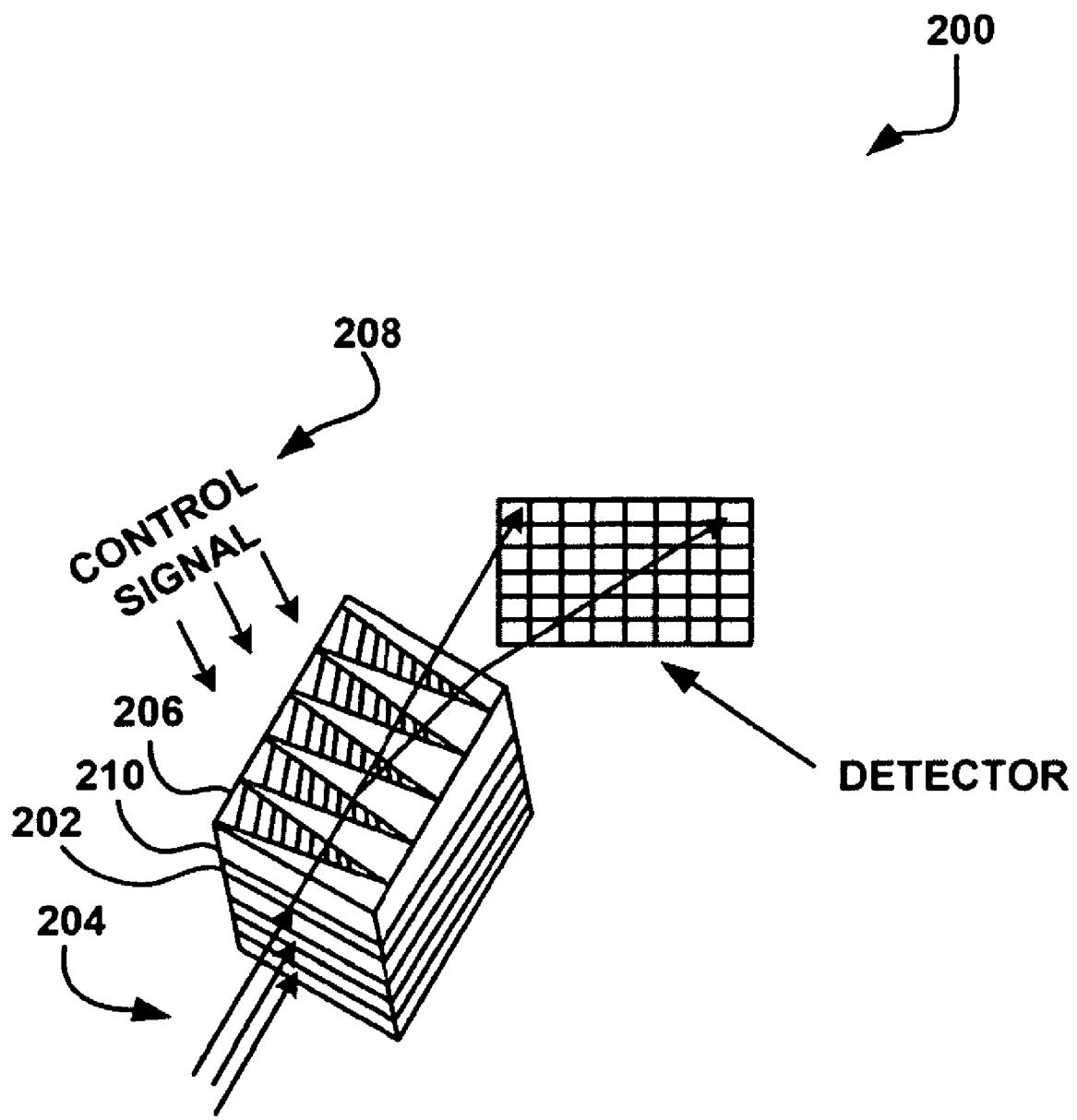

FIGS. 2A and 2B show a beam deflecting structure 200 for deflecting an optical signal input into a waveguide, in accordance with one embodiment. As an option, the beam deflecting structure 200 may be implemented to carry out the method 100 of FIG. 1. Of course, however, the beam deflecting structure 200 may be implemented in any desired environment. It should also be noted that the aforementioned definitions may apply during the present description.

As shown, the structure 200 includes at least one wave guiding layer 202 for guiding an optical input signal 204, and at least one masking layer 206 including a pattern configured to influence characteristics of a material of the guiding layer 202 when an optical control signal 208 is passed through the masking layer 206 in a direction of the guiding layer 202.

In this case, the at least one masking layer 206 may include a material that is opaque to the optical control signal 208, such as a metal. In one embodiment, the masking layer 206 may include chrome. It should be noted, however, that any material opaque to the control signal 208 may be utilized. As an option, the masking layer 206 may be generated utilizing optical lithography.

Furthermore, the guiding layers 202 may include any material suitable for optical guiding. For example, in various embodiments, at least one guiding layer 202 may include one of GaAs, AlGaAs, InGaAs, InGaAsP, or Si. As an option, a cladding layer 210 may be positioned between each adjacent guiding layer, where the cladding layer material includes any suitable material used in the context of waveguides, such as AlGaAs, InGaAsP, Si, oxides, etc.

Although not shown, the structure 200 may be constructed on a substrate, where the substrate material includes any suitable material used in the context of waveguides, such as GaAs, InP, Si, etc. Thus, the system 200 may be configured to operate over a broad spectral band in the visible to near-infrared range using group III-V semiconductors such as GaAs, AlGaAs, InGaAs, InGaAsP, as well as group IV semiconductors such as Silicon and may be extendable to other spectral regions of interest in the visible, UV, and far infrared using other fluence-dependent or intensity-dependent nonlinear mechanisms.

It should be noted, that the waveguide and the mask of FIG. 2, referred to as a deflector element, may be configured to be relatively simple and cost-effective to produce. For example, the deflector element may be easily manufactured and mass-produced using mature fabrication technologies. MOCVD may be utilized for the waveguide growth while optical lithography may be used for the patterning, since lithographic resolution as large as 1 micron can easily preserve temporal resolutions much less than 1 picosecond.

Figure 3:
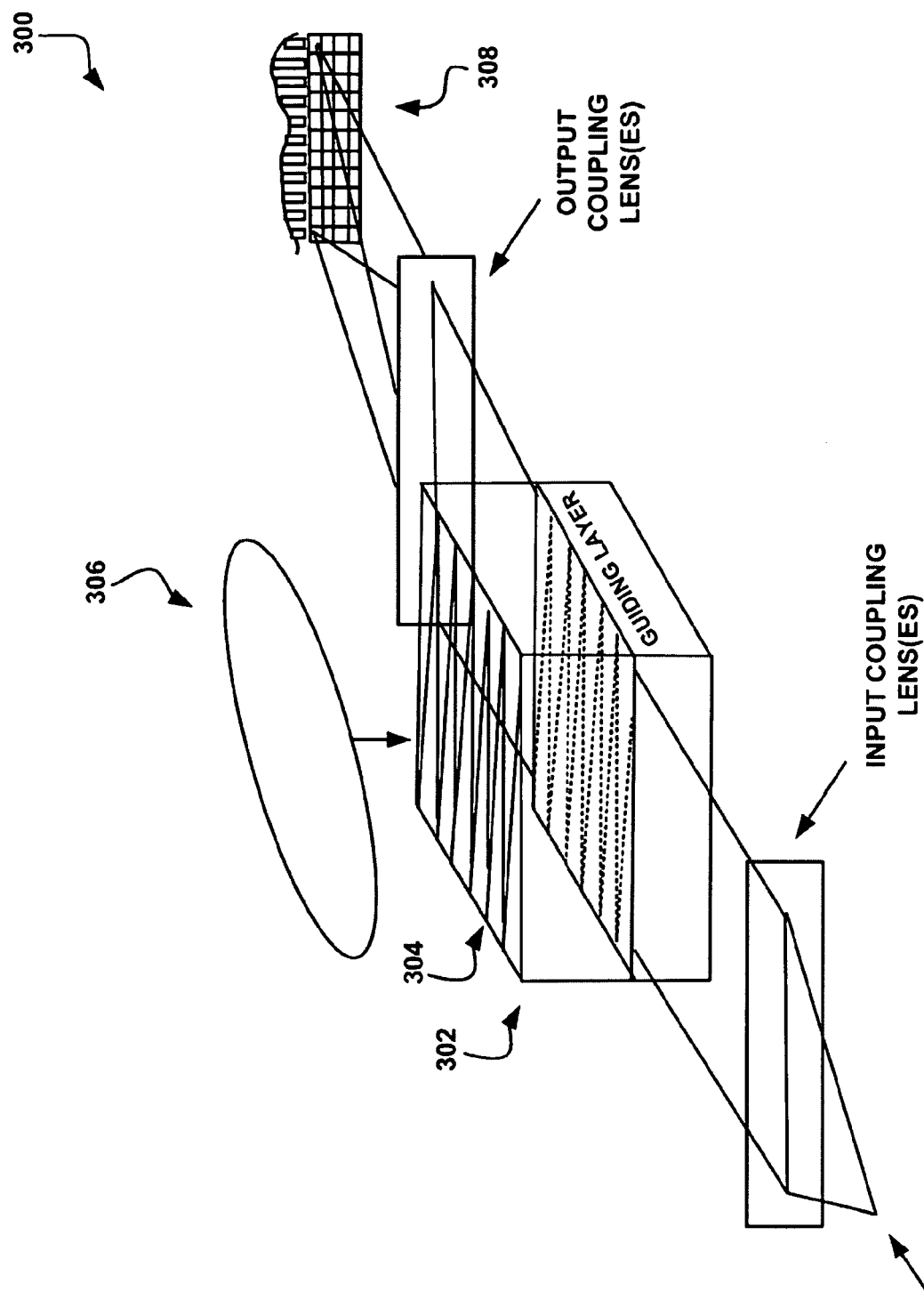
FIG. 3 shows a serrated light illumination system for deflection encoded recording, in accordance with one embodiment.

FIG. 3 shows a serrated light illumination system 300 for deflection encoded recording, in accordance with one embodiment. As an option, the present system 300 may be implemented in the context of the details and architectures of FIGS. 1-2. Of course, however, the system 300 may be implemented in any desired environment. Again, the aforementioned definitions may apply during the present description.

As shown, the system 300 includes a waveguide 302, an attenuating mask 304 positioned on the waveguide, and an optical control source 306 positioned to propagate pulsed laser light towards the attenuating mask 304 and the waveguide 302 such that a pattern of the attenuating mask 304 may be applied to the waveguide 302 and material properties of the waveguide 302 are influenced in the shape of the pattern. Although not shown, the waveguide 302 may include a plurality of wave guiding layers, in addition to a plurality of cladding layers positioned between each adjacent wave guiding layer.

The system 300 may further include a sensor 308 for detecting light output from the waveguide 302. In this case, the sensor 308 may include an array of detectors, each detector corresponding to a pixel. Furthermore, each row of detectors may correspond to one of the wave guiding layers. Thus, each of the wave guiding layers may correspond to an optical input, where each optical input is mapped to the corresponding row of detectors using the corresponding wave guiding layer.

As another option, the system 300 may further comprise a device including memory for recording the detected light. In one embodiment, the structure 300 may be utilized to map fast serial optical signals from a temporal representation into an angular representation. The angle encoded data may then be detected and recorded in parallel using the array of detectors, potentially with a high dynamic range.

It should be noted that the dynamic range of the system 300 is not related to the sampling rate as in the case of conventional oscilloscopes. This is accomplished by decoupling the sampling rate from the dynamic range using the optical mapping technique. Moreover, the mapping technique may operate on single shot (transient) signals and is scalable to a multi-channel imaging geometry.

In operation, the signal-carrying planar waveguide 302 may be top illuminated by the control beam through the serrated amplitude mask 304. The mask 304 does not affect the signal propagating in the planar waveguide until a short control pulse spread out over the entire area of the waveguide 302 is applied transversely (e.g. from the top) through the mask 304. The control beam assumes the pattern of the mask 304 and serves to define an array of triangular wedges or prisms through a nonlinear optical effect.

Specifically, the refractive index experienced by the input signal is modified in proportion to the local fluence or intensity of the patterned control beam creating an array of optically activated prisms. The prisms are responsible for sweeping the input beam angularly as a function of the time of flight (i.e. delay) across the detector 308. This may be achieved by first allowing the input signal to propagate through the unaltered waveguide 302 until the input signal is fully contained within the waveguide 302.

At this time, the control signal pulse may be applied such that the prisms are activated for the remainder of time during which the signal resides within the waveguide 302. The beam exiting the waveguide 302 will now be a beam deflected (e.g. via increasing refracted segments) in linear proportion to the time delay across the input signal. If the wedge array pattern is fine enough, the sampling resolution may be limited by the lateral resolvability of the beam (i.e. inversely proportional to the lateral width of the input bean in the waveguide).

The number of available time samples (i.e. record length) is governed by the index of refraction change multiplied by the length of the waveguide 302 and divided by the wavelength of the input signal. The record length may be limited by the time of flight of input signal through the waveguide 302 (i.e. an overall length of the waveguide 302).

The guiding layer material may include any material that possesses a suitable nonlinear optical response. As an option, the refractive index change may be latched by using a step up pulse with a fast nonlinear optical material response. As another option, the refractive index change may be latched by using a short pulse with a latchable nonlinear optical material response (i.e. a fast rise time and a slow fall time). In these cases, a dynamic semiconductor-based nonlinearity may be utilized.

In another embodiment, a latching nonlinear optical response that requires only a fast rise time and a resolution that is not compromised by a slow fall time (i.e. recovery time) may be implemented. The latching response may be converted into a fast response through differentiation. In this case, the latching response may be converted into a fast response using the discrete deflection distributed along the length of the sample by the time of flight at the speed of light in the deflector.

Upon output from the waveguide 302, the angularly encoded beam may be mapped onto the array of detectors. As an option, the output beam may be mapped using a lens. In general, the detectors need not possess a fast response because the detectors are detecting a gated (i.e. deflection-sampled) slice of time. This allows use of a slower detector array that is not limited to low dynamic range.

Further, the system 300 geometry may be utilized in multiple dimensions. For example, in one embodiment, a stack of planar waveguides may be grown or assembled enabling an extension to a one-dimensional imaging geometry. In order to achieve two-dimensional imaging, or longer record lengths, angle multiplexing of extra channels may be implemented within the plane of each waveguide.

In another embodiment, the system 300 may be configured to incorporate multiple channels multiplexed by three different techniques. This may be useful for recording multiple channels of information (e.g. from different locations/angles in space or other imaging uses), extending the overall temporal record beyond the limitations of a single channel sweep by stitching together various signal copies after traversing differing fiber lengths each equal to an individual sweep time, and/or recording the same signal simultaneously at two or more levels of average intensity on the detector (e.g. to extend the dynamic range of a camera, where one copy would have high points that are saturated while the other would have low points below the noise level).

As an option, a multiplexing technique may include vertical stacking along a dimension perpendicular to the plane of deflection. This may enable full use of a two-dimensional focal plane array of detectors (CCD, CMOS, etc). Multiple planes of deflection may be engineered in a vertically layered structure grown using a variety of known semiconductor growth techniques including molecular-beam epitaxy (MBE), metalorganic chemical vapor deposition (MOCVD), metalorganic vapor phase epitaxy (MOVPE), etc. Each plane could be simultaneously activated by a single pump laser source. The demands on the pump fluence may increase with the number of layers and the uniformity of the sweeps would call for careful tuning of the composition to achieve a consistent absorbed pump energy in each layer. The channels may then be recorded on separate rows of detectors.

As another option, a multiplexing technique may include spectral multiplexing at multiple wavelengths in a common plane of deflection. This wavelength multiplexing technique is similar to wavelength division multiplexing (WDM) in telecommunication systems. After the waveguide, the channels may be separated vertically by adding a diffraction grating. The channels may then be recorded on separate rows of detectors.

As yet another option, a multiplexing technique may include lateral angle-multiplexing at differing launch angles in a common plane of deflection. This angle multiplexing technique is similar to volume holography. After the waveguide, the channels may be separated on the camera, if the camera resolution along one row may be divided into multiple channels.

It should be noted that, using the system 300, a beam of light may be deflected through a single resolvable focal spot at timescales of about 1 picosecond. Furthermore, the system 300 may be viewed as a temporal equivalent of spectrally-dispersive optical devices including diffraction gratings and prisms, operating at timescales of interest for ultrafast/ultrashort pulses with resolutions approaching 1 picosecond. As such, the system 300 may be implemented as a direct temporal disperser, time-to-angle converter, or time-to-space converter. This enables the serial-to-parallel conversion, and parallel-to-serial conversion of a datastream.

In one embodiment, the system 300 may be implemented to directly record, in a single-shot manner, the amplitude of a temporal signal with high dynamic range at timescales near 1 picosecond. This may be accomplished by focusing the output of the deflector onto a high fidelity camera. The rapid response demands on the back-end detector may be alleviated by achieving the rapid mapping of time to space through the front-end deflector. High dynamic range recording may be achieved by relying on the much slower detector array or camera to integrate the deflection-sampled energies in each resolvable time bin.

In another embodiment, the system 300 may be employed to directly record, in a single-shot manner, both the amplitude and phase/frequency content of a temporal signal. Phase information may be recorded by interfering the deflected signal with a reference beam or pulse. This may be implemented as ultrafast temporal interferometry or ultrafast heterodyning. Additionally, amplitude and phase information may be recorded, in one shot, with information derived from two rows of fringes (i.e. in quadrature) on the sensor.

As another option, the system 300 may be implemented to directly record, in a single-shot manner, the spectrogram of a temporal signal. Time versus frequency information may be recorded by implementing a grating that disperses the spectral content of the signal in a direction perpendicular to the plane of deflection. In contrast with other spectrogram-generating methods such a Frequency Resolved Optical Gating (FROG), this would enable much longer record lengths (e.g. 100s of picoseconds, etc.).

The system 300 does not require the signal to be recorded to undergo a spectral/color change as with other nonlinear optical mechanisms based upon harmonic conversion. Additionally, the relative requirements of the pump for the control signal and the input signal are less stringent because a precise photon balance for optimal harmonic conversion efficiency in not needed. For example, while implementing an intense pump source, the signal deflecting in the guiding layer experiences an effectively linear optical process and therefore can be very weak. Thus, there is no requirement for signal intensities strong enough to surmount nonlinear optical thresholds or maintain photon balance.

Further, using the system 300, copies of the same pulse are not required. Thus, the system 300 may be implemented in an energetically efficient manner (e.g. by ratio of record to resolution or number of resolvable elements). For example, the entire signal in one time bin can be routed to a single pixel on the camera.

Because the system 300 can rely on a fluence-dependent effect, the system is therefore highly tolerant/forgiving of pump pulse shape imperfections and/or distortions. In fact, any shape with width shorter than desired resolution may be utilized. Furthermore, the system 300 does not require careful characterization of the pump pulse-shape, which would add to the system complexity and call for frequent calibrations.

In various embodiments, the system 300 may be configured to record signals originally in other spectral domains such as infrared, ultraviolet, x-rays, gamma rays, or particle beams by first encoding the signal using a conversion element.

In one embodiment, a graded rather than a serrated illumination may be applied to the control beam. In this way, an overall pump coupling efficiency may be increased by a factor of two because, in the limit of fine prism spacing, the serrated pattern may resemble a continuous gradient with 50% the overall transmission though the mask.

As an option, the system 300 may be configured to operate in reverse to arbitrarily craft fast pulses. In one embodiment, optical arbitrary waveform generation (OAWG) of this type may be implemented using two deflector elements. For example, the system 300 may be configured to use a first deflector running forward to disperse (e.g. into time segments) a long, coherent pulse into multiple distinct spatial channels, followed by an amplitude and/or phase modulator array to individually tailor each segment, and finally a second deflector running backward to combine the individually tailored time segments into a single channel.

In some cases, an amplitude gradient may be experienced across the recorded data. This may be due to induced free-carrier absorption (FCA). As an option, FCA mitigation may be achieved through the use of a quantum well engineered waveguiding architecture that maximizes a figure of merit (i.e. induced refractive change per unit absorptive change), through a corrector element that imparts a lateral attenuation or gain gradient at the sensor relay plane, or through software correction after detection.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   propagating an optical input signal through a waveguide;
   applying an optical control signal to a mask positioned relative to the waveguide such that the application is used to influence the optical input signal propagating in the waveguide; and
   detecting the optical input signal output from the waveguide,
   wherein the mask includes a pattern,
   wherein the pattern includes a pattern of triangles.

2. The method of claim 1, wherein the optical control signal acquires the pattern by passing through the mask.

3. The method of claim 2, wherein the optical control signal imprints the pattern into the waveguide.

4. The method of claim 3, wherein material characteristics of the waveguide are altered in locations defined by the pattern.

5. The method of claim 4, wherein at least a portion of the input signal is influenced by the pattern imprinted in the waveguide.

6. The method of claim 4, wherein the altered material characteristics of the waveguide alter optical characteristics of the input signal.

7. The method of claim 4, wherein the altered material characteristics of the waveguide include an index of refraction.

8. The method of claim 4, wherein the influencing includes changing a direction of a portion of the input signal output from the waveguide.

9. The method of claim 8, wherein a length of time of propagation of the input signal corresponds to an amount of the change of the portion of the input signal.

10. The method of claim 1, wherein the detecting is performed utilizing an array of detectors.

11. A method comprising:
propagating an optical input signal through a waveguide;
applying an optical control signal to a mask positioned relative to the waveguide such that the application is used to influence the optical input signal propagating in the waveguide; and
detecting the optical input signal output from the waveguide,
wherein the detecting is performed utilizing a camera.

12. A method comprising:
propagating an optical input signal through a waveguide;
applying an optical control signal to a mask positioned relative to the waveguide such that the application is used to influence the optical input signal propagating in the waveguide; and
detecting the optical input signal output from the waveguide,
wherein the optical control signal includes laser light from a pulsed laser source synchronized with the input signal.

13. The method of claim 12, wherein the optical control signal pulse has a shorter duration than a time scale of the detecting.

14. A method comprising:
propagating an optical input signal through a waveguide;
applying an optical control signal to a mask positioned relative to the waveguide such that the application is used to influence the optical input signal propagating in the waveguide; and
detecting the optical input signal output from the waveguide,
wherein a wavelength of the optical control signal is shorter than a band gap of a material used for the waveguide.

15. A method comprising:
propagating an optical input signal through a waveguide;
applying an optical control signal to a mask positioned relative to the waveguide such that the application is used to influence the optical input signal propagating in the waveguide;
detecting the optical input signal output from the waveguide; and
spectral multiplexing at multiple wavelengths in a common plane of deflection,
wherein a diffraction grating is utilized to separate a plurality of channels for the spectral multiplexing.

16. A method comprising:
propagating an optical input signal through a waveguide;
applying an optical control signal to a mask positioned relative to the waveguide such that the application is used to influence the optical input signal propagating in the waveguide;
detecting the optical input signal output from the waveguide; and
lateral angle-multiplexing at differing launch angles in a common plane of deflection,
wherein channels are separated on a camera for the lateral angle-multiplexing.

17. A method comprising:
propagating an optical input signal through a waveguide;
applying an optical control signal to a mask positioned relative to the waveguide such that the application is used to influence the optical input signal propagating in the waveguide;
detecting the optical input signal output from the waveguide; and
recording, in a single-shot manner, an amplitude and a phase content of the input signal.

18. A method comprising:
propagating an optical input signal through a waveguide;
applying an optical control signal to a mask positioned relative to the waveguide such that the application is used to influence the optical input signal propagating in the waveguide;
detecting the optical input signal output from the waveguide; and
recording, in a single-shot manner, a spectrogram of the input signal.

19. A method comprising:
propagating an optical input signal through a waveguide;
applying an optical control signal to a mask positioned relative to the waveguide such that the application is used to influence the optical input signal propagating in the waveguide;
detecting the optical input signal output from the waveguide; and
mitigating free-carrier absorption by utilizing a corrector element that imparts a lateral attenuation or gain gradient at a sensor relay plane.

20. A beam deflecting structure comprising:
at least one wave guiding layer for guiding an optical input signal; and
at least one masking layer including a pattern of triangles configured to influence characteristics of a material of the at least one wave guiding layer when an optical control signal is passed through the at least one masking layer in a direction of the at least one wave guiding layer.

21. The structure of claim 20, wherein the at least one masking layer includes a material that is opaque to the optical control signal.

22. The structure of claim 21, wherein the at least one masking layer includes a metal.

23. The structure of claim 21, wherein the at least one masking layer is generated utilizing optical lithography.

24. The structure of claim 20, wherein the at least one wave guiding layer includes one of GaAs, AlGaAs, InGaAs, InGaAsP, or Si.

25. The structure of claim 20, wherein a cladding layer is positioned between adjacent guiding layers.

26. A system comprising:
a waveguide;
an attenuating mask; and
an optical control source positioned to propagate pulsed laser light towards the attenuating mask and the waveguide such that a pattern of the attenuating mask is applied to the waveguide and material properties of at least a portion of the waveguide are influenced,
wherein the waveguide includes a plurality of wave guiding layers oriented in a stacked configuration.

27. The system of claim 26, wherein the ontical control source is synchronized with an optical signal input to the waveguide.

28. A system comprising:
a waveguide;
an attenuating mask; and an optical control source positioned to propagate pulsed laser light towards the attenuating mask and the waveguide such that a pattern of the attenuating mask is applied to the waveguide and material properties of at least a portion of the waveguide are influenced, wherein the waveguide includes a plurality of wave guiding layers, wherein the waveguide further includes a plurality of cladding layers positioned between each adjacent wave guiding layer.

29. The system of claim 26, further including a sensor for detecting light output from the waveguide.

30. The system of claim 29, wherein the sensor includes an array of detectors, each detector corresponding to a pixel.

31. The system of claim 30, wherein each row of detectors corresponds to one of the wave guiding layers.

32. The system of claim 31, wherein each of the wave guiding layers corresponds to an optical input, each optical input being mapped to the corresponding row of detectors.

33. A system comprising:
a waveguide;
an attenuating mask; and
an optical control source positioned to propagate pulsed laser light towards the attenuating mask and the waveguide such that a pattern of the attenuating mask is applied to the waveguide and material properties of at least a portion of the waveguide are influenced; and
a device including memory for recording the detected light.

34. A system comprising:
a waveguide;
an attenuating mask; and
an optical control source positioned to propagate pulsed laser light towards the attenuating mask and the waveguide such that a pattern of the attenuating mask is applied to the waveguide and material properties of at least a portion of the waveguide are influenced,
wherein the system is configured to operate in reverse for optical arbitrary waveform generation.

* * * * *